UNITED STATES PATENT OFFICE.

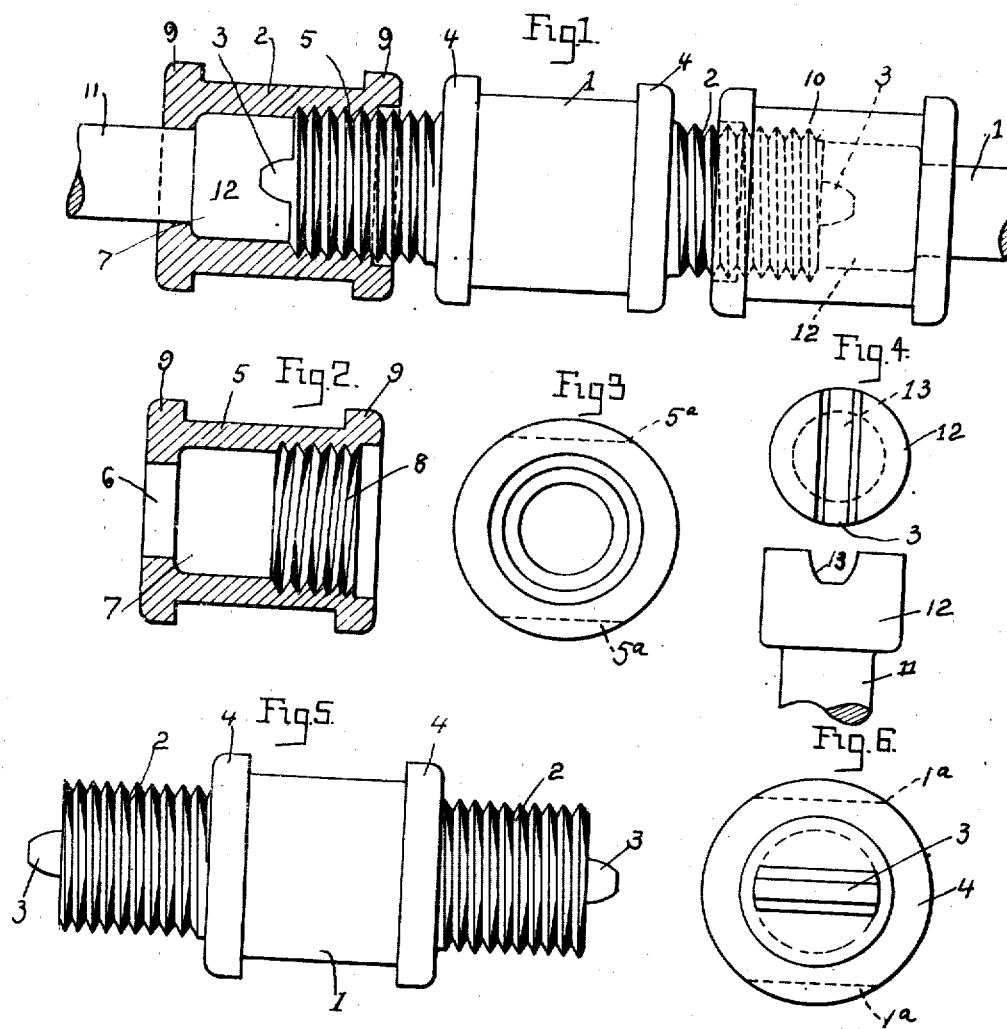

CARL H. BALDWIN, OF FELLOWS, CALIFORNIA.

ROD-COUPLING.

1,265,418.  Specification of Letters Patent.  Patented May 7, 1918.

Application filed November 21, 1917. Serial No. 203,258.

*To all whom it may concern:*

Be it known that I, CARL H. BALDWIN, a citizen of the United States, residing at Fellows, in the county of Kern and State of California, have invented certain new and useful Improvements in Rod-Couplings, of which the following is a specification.

This invention relates to rod couplings, and more particularly to those for connecting sucker rods used in wells.

The object of the invention is to so construct a coupling of this character that rods may be connected thereby without turning the rods and which has a joint constructed to prevent them from unscrewing when in the well.

Another object is to so construct a coupling of this character that swelling of the parts is prevented which interferes with the unscrewing thereof and in which all possibility of the entrance of sand is prevented.

With the foregoing and other objects in view, which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1 represents a side elevation partly in section of a coupling constructed in accordance with this invention and shown applied, Fig. 2 is a longitudinal section of one of the sleeves constituting a part of this invention, Fig. 3 is an end view thereof, Fig. 4 is an end view and a side elevation respectively of the enlarged end of the rod to be connected, Fig. 5 is a side elevation of the central member of the coupling, and Fig. 6 is an end elevation thereof.

The rod coupling constituting this invention comprises a central connecting member 1 and two sleeves 5 and 10. The member 1 has exteriorly threaded extensions 2 with ribs 3 at their free ends which extend transversely thereof, said ribs tapering toward their free edges. Flanges 4 are formed at the bases of the extensions 2 and between these flanges 4 the member 1 is flattened at diametrically opposite points as shown in dotted lines at 1ª in Fig. 6 to facilitate the gripping thereof by a wrench.

The sleeves 5 and 10 are exactly alike in construction and hence one only will be described in detail. The sleeve 5 has an opening 6 in its outer end through which one of the rods 11 to be connected is designed to extend, a shoulder or seat 7 being formed within said sleeve around said opening so that the head 12 of said rod end may seat thereon when the parts are in operative position as is shown clearly in Fig. 1. This sleeve 5 is interiorly threaded at its other end as shown at 8, the threads thereof extending about one half the length of the sleeve, more or less. Flanges 9 extend radially from the opposite ends of the sleeve 5 and said sleeve is preferably flattened at diametrically opposite points as shown at 5ª to facilitate the gripping thereof by a wrench when the sleeve is to be screwed or unscrewed.

The rods 11 to be connected which have the enlarged heads 12 at their ends are provided in said ends with transversely extending grooves 13 which are shaped to conform to the ribs 3 carried by the central coupling member 1 and in which said ribs are designed to seat when the parts are connected to prevent the rods and said member from turning relatively to each other. It will thus be seen that in the use of this device when the sleeves 5 and 10 have been placed on the ends of the rods 11 to be connected, the sleeves are moved backwardly to dispose the grooved ends of the heads 12 and permit them to be engaged with the ribs 3 of the central connecting member 1. When these parts are so positioned the sleeves 5 and 10 are moved toward each other and screwed onto the extensions 2 of said member 1 until they assume the position shown in Fig. 1 with the inner ends or bases of the heads 12 engaging the seats 7 of said sleeves.

When the parts are so positioned the rods 11 will be securely and reliably connected and all danger of their becoming separated is prevented, the interlocking engagement of the ribs 3 with the grooves 13 operating to prevent all possibility of said rod ends turning with respect to the central connecting member 1 and a close fit between the sleeve 5 and 10 and the ends of the rods 11 prevent all possibility of sand working into the sleeves. Moreover, the sleeves 5 and 10 are formed of material sufficiently heavy to prevent swelling of the parts as it is very objectionable to have this occur since it prevents the unturning or unscrewing of the parts should it for any reason be desired to disassemble them.

From the foregoing description, taken in connection with the accompanying drawings, the advantages of the construction and of the method of operation will be readily apparent to those skilled in the art to which the invention appertains and while I have described the principle of operation of the invention together with the device which I now consider to be the best embodiment thereof, I desire to have it understood that the device shown is merely illustrative and that such changes may be made as are within the scope of the claimed invention.

I claim:—

1. A rod coupling comprising a central member having extensions at its opposite ends, rods for connection adapted to abut the extensions of said coupling member, said ends of the rods and said member having interlocking elements to hold them against turning relatively to each other, and sleeves carried by said rod ends and engaging said extensions.

2. A coupling of the class described comprising a central member having reduced exteriorly threaded extensions with ribs extending transversely across the free ends thereof, sleeves having interiorly threaded ends for engagement with said extensions and openings at their other ends surrounded by internal seats to connect with the ends of the rods to be connected.

3. A rod coupling comprising a central member having exteriorly threaded extensions at its opposite ends with stops at the bases of said extensions, rods having heads at the ends to be connected, said heads designed to abut against the extensions of said coupling member, one of said abutting ends having a groove and the other a rib to fit therein, sleeves carried by said rod ends and internally threaded at one end to engage the threaded extensions of said coupling member.

4. The combination with two rods to be connected each having an enlarged head at its free end, said heads being grooved transversely; of a central coupling member having ribs to fit in the grooves of said rod ends, sleeves to be mounted on said rods ends, sleeves having seats at one end to engage the inner ends of the heads on said rod ends, the other ends of said sleeves being threaded and the extensions of said central member being threaded for engagement with the threaded portions of said sleeves.

In testimony whereof I affix my signature in presence of two witnesses.

CARL H. BALDWIN.

Witnesses:
OTTO KRAMER,
CHARLES H. MORGAN.